United States Patent [19]

Possati et al.

[11] 4,348,814

[45] Sep. 14, 1982

[54] GAUGE FOR CHECKING LINEAR SIZES OF MECHANICAL PARTS

[75] Inventors: Mario Possati; Guido Golinelli, both of Bologna; Narciso Selleri, Monteveglio, all of Italy

[73] Assignee: Finike Italiana Marposs, S.p.A., S. Marino di Bentivoglio, Italy

[21] Appl. No.: 171,160

[22] Filed: Jul. 22, 1980

[30] Foreign Application Priority Data

Jul. 24, 1979 [IT] Italy .................................. 3464 A/79
Jun. 2, 1980 [IT] Italy .................................. 3432 A/80

[51] Int. Cl.³ .............................................. G01B 5/12
[52] U.S. Cl. .............................. 33/178 E; 33/148 H; 33/147 K
[58] Field of Search ............. 33/178 R, 178 E, 178 F, 33/147 K, 172 R, 172 E, 172 B, 143 L, 147 N, 148 R, 148 H

[56] References Cited

U.S. PATENT DOCUMENTS 3,943,632  3/1976  Albertazzi .................. 33/174 L
4,077,130  3/1978  Possati ....................... 33/178 E

FOREIGN PATENT DOCUMENTS 2243419  5/1973  France .
1010553  4/1974  Italy .
1303940  1/1973  United Kingdom .
1347736  5/1973  United Kingdom .
1442204  6/1974  United Kingdom .
1486303  8/1974  United Kingdom .
2009936  6/1979  United Kingdom .

Primary Examiner—Harry N. Haroian
Attorney, Agent, or Firm—Stevens, Davis, Miller & Mosher

[57] ABSTRACT

A gauge for checking linear sizes of mechanical parts including a handle, a nose-piece, an integral body defining two movable arms and fulcrum devices for rotational displacements of the arms, and a support plate coupled to the handle, the nose-piece and the integral body.

The support plate has the form of a ring plate with two parts protruding towards the interior for defining two reference surfaces adapted to limit the opening stroke of the movable arm.

12 Claims, 7 Drawing Figures

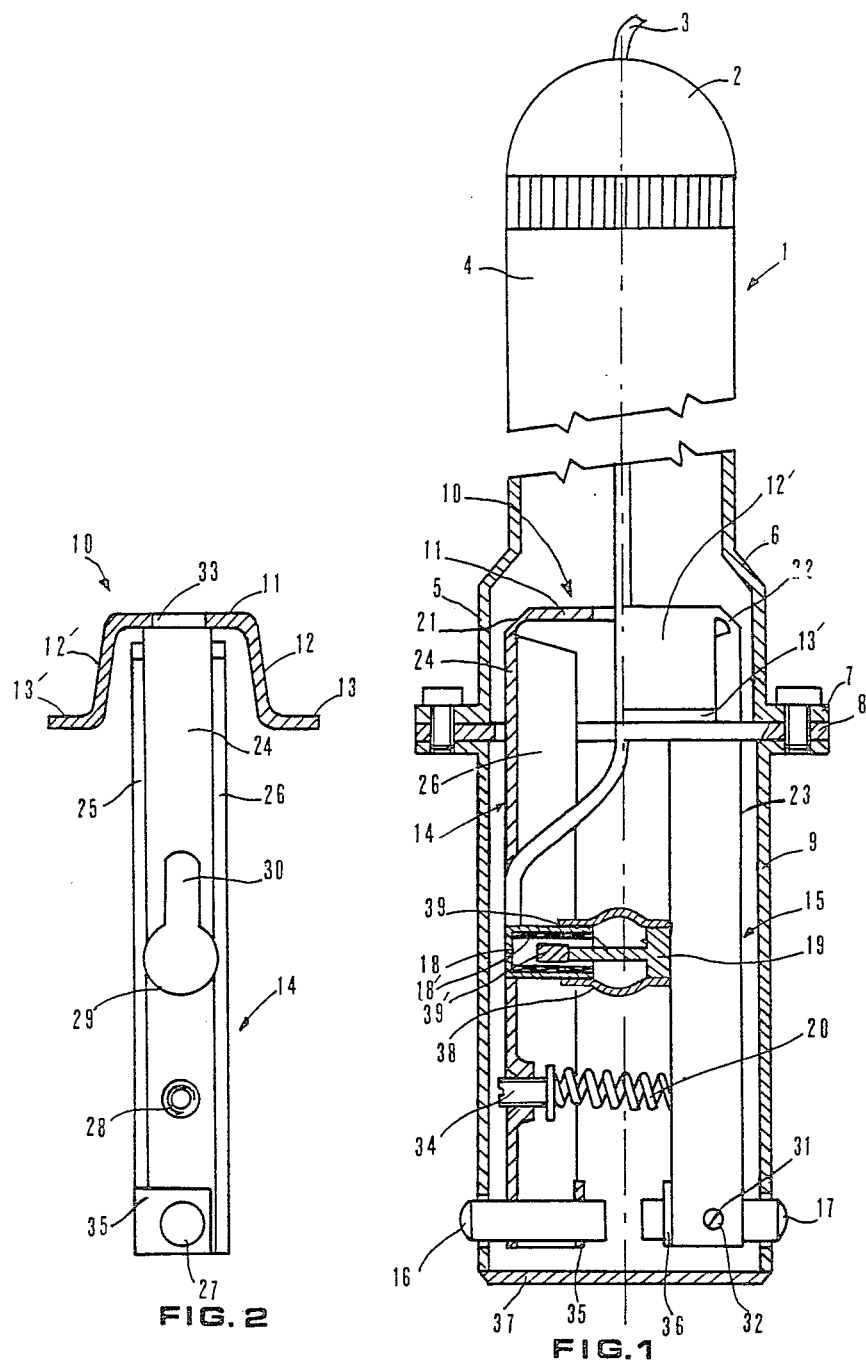

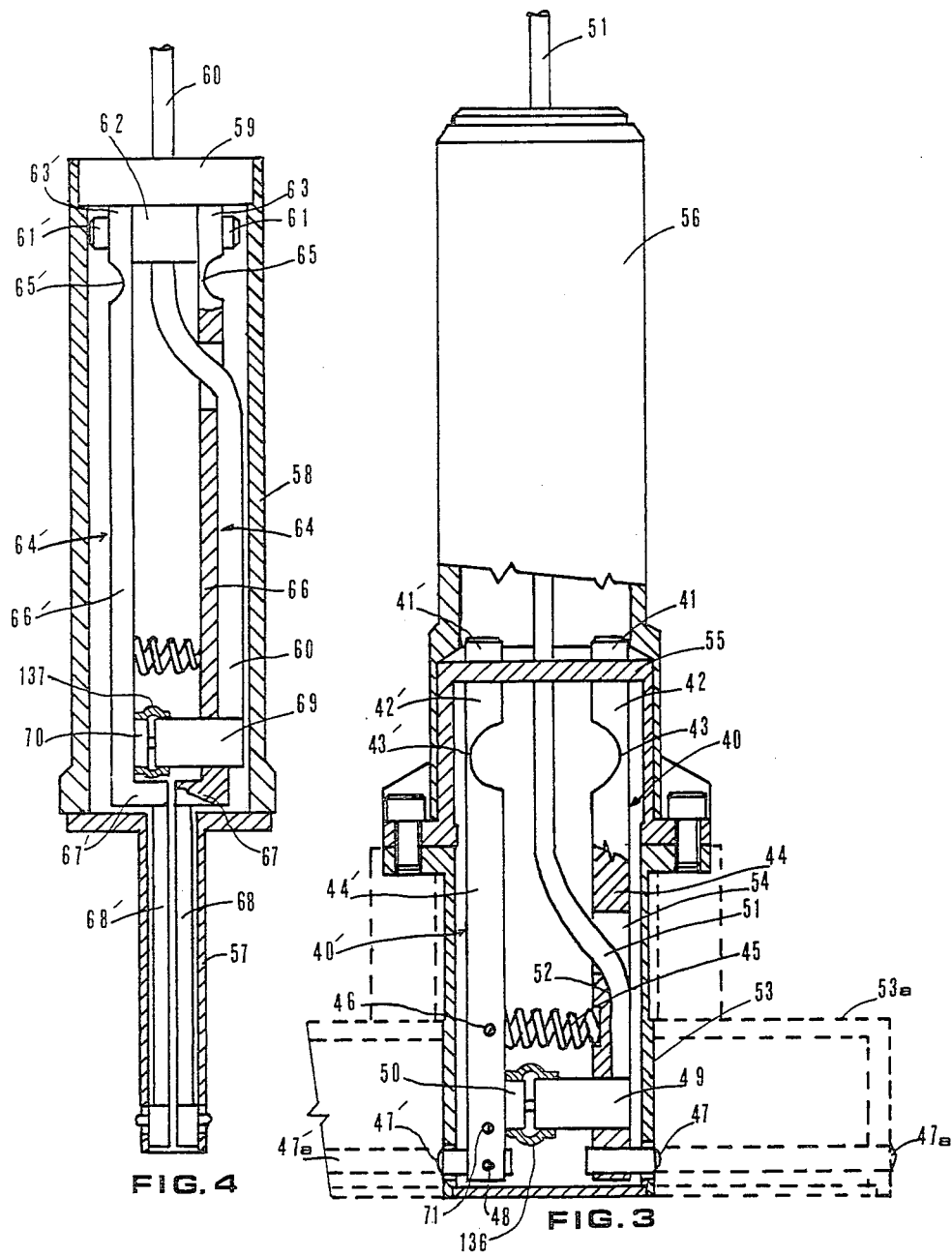

GAUGE FOR CHECKING LINEAR SIZES OF MECHANICAL PARTS

The present invention relates to a gauge for checking linear sides of mechanical parts, with a support, two movable arms, two feelers fixed to the movable arms, respectively, for contacting the part to be checked, two fulcrum devices adapted to permit rotation movements of the arms with respect to the support and a position transducer substantially comprising two parts fixed to the movable arms, respectively.

More particularly, the invention relates to a manual plug-gauge for checking diameters of bores.

Manual plug-gauges for controlling on bench bores of mechanical parts are already known.

For example, Italian Pat. No. 1.010.553 discloses a plug-gauge, for controlling on bench bores of mechanical parts, which includes two movable arms carrying at one of their ends two feelers and at the other ends two movable elements of a position transducer. The movable arms are fixed at intermediate points to an element-fixed on its turn to the frame of the gauge-including two thin flexible sections acting as rotation fulcrums. This known gauge further comprises a nose-piece for centering the gauge in the bore and for protecting the movable arms and the feelers.

Important features for a gauge, in particular for a manual gauge, are-in addition to the accuracy and the repeatability of the measurements-limited manufacturing and repair costs, sturdiness, small overall dimensions, the possibility to easily adapt the gauge for use in different measurement ranges.

The technical problem the present invention intends to solve is that of providing a gauge, particularly but not exclusively for manual applications, which has, in comparison with the gauges of the prior art, a reduced cost, a very simple structure, high sturdiness, flexibility of use, easy operation, and limited overall dimensions and weight.

This technical problem is solved by a gauge of the type outlined at the beginning of this description wherein, according to the invention, each movable arm with the relevant fulcrum device is made of a single member, the member having one end coupled to the support and carrying, on the same side with respect to the fulcrum device, a relevant feeler and a relevant part of the transducer.

According to an additional feature of the present invention, the gauge consists of a plug-gauge for checking diameters of bores and further comprises a protection nose-piece fixed to the support, the support including a plate defining a central hole crossed by the movable arms, the plate defining two limited internal reference surfaces adapted to cooperate with the movable arms for limiting their opening stroke.

Some embodiments of the invention will be described in detail with reference to the annexed drawings, given by way of examples, wherein:

FIG. 1 is a fragmentary partly in section elevational view of a manual plug-gauge according to a first embodiment of the invention;

FIG. 2 is a sectioned elevational view of a member including the movable arms of the plug-gauge of FIG. 1;

FIG. 3 is a partly in section elevational view of a manual plug-gauge according to a second embodiment of the invention;

FIG. 4 is a partly in section elevational view of a manual plug-gauge according to a third embodiment;

Figure 5:
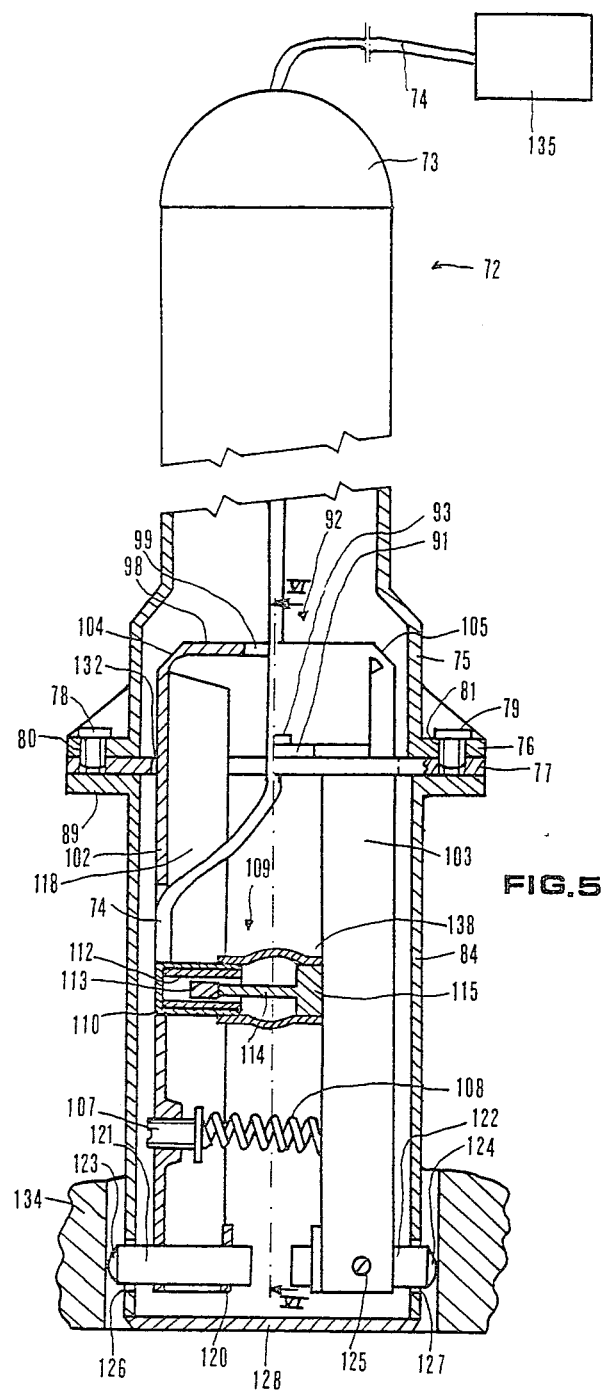
FIG. 5 is a fragmentary partly in section elevational view of a manual plug-gauge according to a fourth and preferred embodiment.

The plug-gauge shown in FIG. 1 includes a hollow handle 1 having its upper end closed by a cap 2 having a hole, not shown, crossed by a cable 3. Handle 1 has an upper portion 4 with circular cross-section, a lower portion 5 with circular cross-section having a diameter larger than that of portion 4, and an intermediate portion 6 connecting portions 4 and 5. Lower portion 5 terminates with a flange 7 which serves for joining handle 1, a ring body 8 and a nose-piece 9.

A structure 10 (FIGS. 1 and 2), constituted by a single body or member obtained by bending a shaped spring steel plate, includes a first upper section 11 with a substantially rectangular periphery and with a central hole 33 crossed by cable 3, two second sections 13,13' lying in a plane parallel to that defined by section 11 and two intermediate sections 12,12' substantially perpendicular to the first and second sections.

Sections 13,13' are locked, in a way not shown, to two sections, not shown, of ring body 8, which protrude towards the interior.

Structure 10 further includes two movable arms 14,15 which support stems having feelers 16,17. Moreover movable arms 14,15 support parts 18, 19 of a differential-transformer position transducer and a pressure spring 20 which substantially produces the contact force of feelers 16,17 on the mechanical part to be checked.

Arms 14,15 are obtained by bending two wings of the shaped steel plate and are connected with upper section 11 through two sections 21, 22 which are lightened, for example by two flat chamfers, in such a way as to define two fulcrums allowing the rotation of arms 14,15 about axes perpendicular to the same arms 14,15. Each arm 14 or 15 includes a section 23 or 24 substantially parallel to the longitudinal axis of the gauge and two sections 25, 26 bent perpendicularly to sections 23 or 24, in such a way that the arm has a channel cross-section. Each arm 14 or 15 further comprises a bent wing 35 or 36, substantially parallel to sections 24 or 23, respectively.

The shape of arms 14,15 gives to them a considerable resistance to mechanical stresses, and in particular to flexing stresses. Stems with feelers 16,17 are housed through bores 27 of arms 14,15 and bores obtained in wings 35,36 and are locked by screws coupled to threaded holes 31 of arms 14,15.

Structure 10 may be made of a spring steel plate having a thickness of about 1.5 mm, for example. In this case connecting sections 21, 22 are lightened to render them sufficiently flexible to permit the desired rotation of arms 14,15 about the relevant fulcrums.

Structure 10 may also be made of a spring steel plate having a lower thickness (e.g. 1 mm) in such a way that the connecting sections are sufficiently flexible without any need of lightening them in particular.

The position transducer includes a cylindrical shell 18 containing electric windings 18', connections of winding 18' with cable 3 and a cylindrical support 19 with a stem 39 carrying, at its end arranged within shell 18, a magnetic core 39'. Between windings 18' and stem 39 with core 39' there is sufficient radial play to guarantee the free axial displacement of core 39'.

Cable 3, which contains the supply and output leads of the transducer, comes out at a side of shell 18, near an end of the shell which is sealed by a suitable resin.

Shell 18 and support 19 are housed in bores 29 and locked to arms 14,15, with the possibility of axial adjustments, in a way not shown.

An opening 30 (FIG. 2) allows the passage of cable 3, which extends axially within the plug-gauge.

A resilient gasket 38 has its ends sealed onto support 19 and shell 18. The basis of support 19 opposite to that adjacent shell 18 is closed, therefore the transducer (intended as the set comprising support 19 with stem 39 and core 39', shell 18 with windings 18', cable 3 and the above mentioned resin, and gasket 38) is completely sealed.

The tension of spring 20 may be adjusted by screws 34 coupled to threaded holes 28. Nose-piece 9, closed at its lower end by a cover 37, serves as an element for protecting arms 14,15 and the position transducer and for centering the plug-gauge with respect to the bore to be checked.

When nose-piece 9 is inserted into a bore to be checked, feelers 16,17 contact the bore surface and cause rotation displacements of arms 14,15 about the relevant fulcrums defined by sections 21, 22. The change of the mutual position of arms 14,15 causes a variation of the mutual position of windings 18' and core 39', connected to the arms. The output signals of the transducer consequently changes and takes a value responsive to the deviations of the bore diameter from a relevant nominal value. The output signal provided by the transducer is amplified and visualized by an amplifying and indicating group, not shown, which is connected to the transducer through cable 3.

From the preceding description it is clear that the gauge has a very simple construction, constituted by a small number of elements, is sturdy and with limited axial overall dimensions, because the position transducer and the feelers are coupled to the moving arms on the same side with respect to the fulcrums.

In particular, the construction of arms 14,15 and of relevant supports and fulcrum devices by a single integral member made of shaped and bent spring steel plate, enables a strong reduction of the machining and assembling costs and permits elimination of the clearances and frictions necessarily involved in connection with the structures of conventional gauges, composed of a plurality of coupled elements.

Moreover, the structure and the arrangements of the gauge components, in particular arms 14,15 and the transducer, guarantee an operation substantially without slidings and frictions and this is of paramount importance for obtaining excellent accuracy and repeatability of the measurements.

FIG. 3 shows some variants with respect to the embodiment of FIGS. 1 and 2. In the plug-gauge of FIG. 3 two equal members 40 and 40', each consisting of an integral piece, are locked by screws 41, 41' to a support element 55. Member 40 (and similarly member 40') includes a first portion 42 with rectangular cross-section, a second portion 43 lightened to define a thin resiliently flexible section acting as a fulcrum, and a third portion 44—with a cross-section like that of portion 42—which constitutes an arm movable about the fulcrum defined by portion 43.

Movable arms 44, 44' define two seats which house the ends of a spring 45. Screws 46 lock the ends of spring 45 in the relevant seats. Arms 44, 44' have, near their free ends, bores housing stems with relevant feelers 47, 47'.

Stems with feelers 47,47' are locked to arms 44,44' by screws 48. Arms 44,44' define further relevant bores for housing the parts 49, 50 of a differential-transformer position transducer. Parts 49,50 are adjustably locked by lock screws 71 and a resilient gasket 136 has its end sealed onto parts 49,50.

A cable 51, containing the supply and output leads of the transducer, comes out at a side of part 49 and is partially housed in a slot 52 of arm 44, at the side adjacent to the inner surface of a nose-piece 53. Cable 51 passes through a hole 54 of arm 44, through a hole (not shown) of a support element 55 and a hole (not shown) of a handle 56 and reaches a supply and indicating unit, not shown.

For the sake of constructional simplicity and for rendering members 40,40' interchangeable, the latter are, as before mentioned, equal and therefore in arm 44' slot 52' and hole 54' are not utilized.

Due to the sturdiness of construction, it is possible to use the plug-gauge of FIG. 3 for checking diameters in a different measuring range, by substituting, as shown by dashed lines, a suitable nose-piece 53a for nose-piece 53 and stems with feelers 47a, 47'a of suitable lengths for stems with feelers 47,47'.

Similar possibilities do exist for the plug-gauge of FIGS. 1 and 2.

The plug-gauge shown in FIG. 4 differs from that of FIG. 3 mainly because, having to check diameters rather small (e.g. of less than 3 cm), it comprises a nose-piece 57 with an internal diameter which does not permit to house the position transducer within the same nose-piece.

The plug-gauge of FIG. 4 includes a handle 58 with a circular closing plate 59 defining a hole, not shown, for the passage of a cable 60.

A block 62 is fixed to plate 59 and two equal members 63,63'— including moving arms 64,64' with relevant sections 65,65' defining fulcrums—are locked to block 62 by screws 61, 61'.

Moving arms 64, 64' include two portions 66, 66' arranged within handle 58, substantially along the axial direction, two radial portions 67, 67' and two other portions 68, 68' arranged within nose-piece 57, substantially along the axial direction. Parts 69, 70 of a position transducer are fixed to portions 66, 66' and therefore are located within handle 58 instead of within nose-piece 57. A resilient gasket 137 has its end sealed onto parts 69, 70.

The plug-gauge of FIG. 5 includes a handle 72 closed at its upper end by a cap 73 defining a hole, not shown, for the passage of a cable 74.

The lower part 75 of handle 72 has a flange 76 which serves to lock the handle to a support element, consisting essentially of a ring plate 77. The connection between flange 76 and plate 77 is achieved by two screws 78, 79 passing through holes 80,81 of flange 76 and coupled with threaded holes 82,83 of plate 77 (FIG. 7), so as to clamp the lower face of flange 76 to the upper face of plate 77.

Plate 77 also supports a protective and centering nose-piece 84, through four screws, not visible, passing through holes 85-88 of plate 77 and coupled with threaded holes, not visible, obtained in a flange 89 of nose-piece 84, in such a way that the upper face of flange 89 is clamped against the lower face of plate 77.

Moreover plate 77 acts as a supporting element of the arm-set of the gauge because to the upper face of plate 77 are coupled the lower faces of two flanges 90,91 which form (FIG. 6) an integral member 92 with the arm-set; the coupling is obtained by two screws, one of which, 93, shown in FIG. 5, which pass through holes 94, 95 of flanges 90, 91 and are coupled with threaded holes 96,97 of plate 77.

Figure 7:
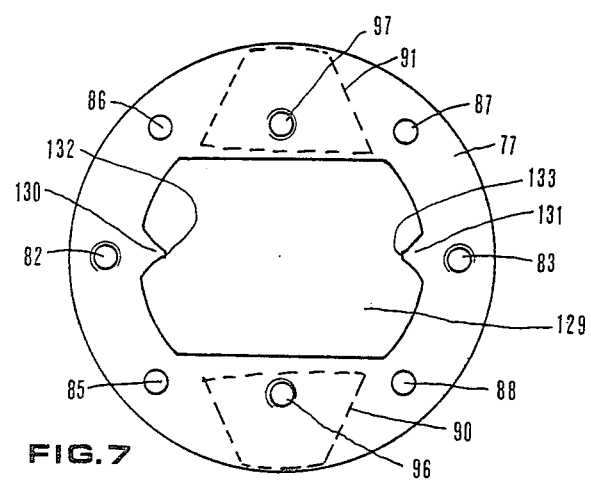
FIG. 7 is a plan view of an element of the gauge of FIGS. 5 and 6, this element consisting of a plate for supporting the movable arms and for limiting their opening stroke.

Flanges 90, 91, partially shown by dashed lines in FIG. 7, are oppositely arranged with respect to the vertical plane passing through the gauge axis and the axes of holes 82, 83.

Member 92, obtained by bending a shaped spring steel plate, also includes an upper base 98 with substantially rectangular periphery and with a hole 99 for the passage of cable 74, two portions 100,101 for connecting flanges 90,91 with base 98 and two movable arms 102, 103. Arms 102, 103 are obtained by bending two wings of the steel plate and are integrally connected with upper base 98 by two sections 104, 105 lightened by flat chamfers, as shown in FIG. 5, which define two fulcrums permitting rotation displacements of arms 102, 103 about relevant axes perpendicular to the arms.

Figure 6:
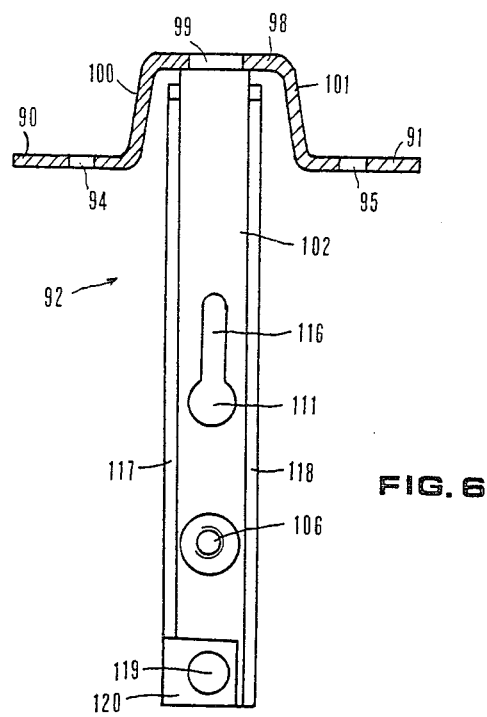
FIG. 6 is a sectional elevational view, taken on line VI—VI of FIG. 5, of the arm-set of the gauge of FIG. 5.

The shapes of arms 102, 103 are substantially similar and therefore only the shape of arm 102 is now described with reference to FIGS. 5 and 6.

Arm 102 has a channel cross-section, in order to have a high resistance to bending stress, and has a threaded hole 106 for a screw 107 (FIG. 5) which supports an end of a pressure spring 108 which biases arms 102, 103 for moving them away from each other. The mutual position of arms 102, 103 is detected by a differential transformer transducer 109. Transducer 109 includes a cylindrical shell 110 housed in a hole 111 of arm 102 and fixed to the same arm 102. Shell 110 contains the primary and secondary windings 112 of the differential transformer. A magnetic core 113, carried by a stem 114 coupled to a small cylinder 115 fixed to arm 103, is movable along the axis of the transformer windings 112. A resilient gasket 138 has its ends sealed onto shell 110 and cylinder 115. Cable 74, which contains the leads connected to windings 112, comes out of shell 110 and passes through an opening 116 of arm 102 communicating with hole 111.

Arms 102, 103 are, as above mentioned, channel shaped and therefore have bent wings 117, 118; arms 102, 103 have at their free ends holes 119, passing through further bent wings 120, for housing stems 121, 122 carrying relevant feelers 123, 124. Stems 121, 122 are locked to arms 102, 103, respectively, by screws 125 permitting to adjust the position of the stems 121, 122 and thus of feelers 123, 124 substantially along a diametral direction of the plug-gauge.

Nose-piece 84 defines two holes 126,127 for the passage of feelers 123,124 and has its lower base closed by a circular cover 128.

Plate 77 (FIG. 7) has substantially a ring form with a hole 129 and comprises two parts 130,131, protruding towards the interior, which have approximately the shape of triangular prisms with chamfered edges 132, 133.

Parts 130, 131, which are diametrally opposite along a direction perpendicular to that along which are arranged flanges 90,91, form abutment surfaces adapted to limit the opening stroke of arms 102, 103. In fact, as it is shown in FIG. 5, arms 102, 103 pass through hole 129 because base 98 and the free ends of the arms are arranged at opposite sides with respect to the plane defined by plate 77. In correspondence with plate 77, the central part of the channel cross-section of arms 102, 103 is adjacent to edges 132, 133. Therefore, if the mechanical part 134 shown in FIG. 5 is taken away, the opening movement caused by spring 108 is limited due to the contact of said central part of the channel cross-section with edges 132, 133.

On the contrary, when nose-piece 84 is inserted into a part bore to be checked, feelers 123, 124—which at rest condition protrude from the outer surface of hose-piece 84 by a given quantity with respect thereto—cause arms 102, 103 to close in moving to the measuring position and it is possible to read on a supply and indicating group 135, connected with cable 74, the deviation of the bore diameter from the diameter value of a master-piece, which is used, as it is known, for zero setting the gauge.

As set forth above, a single element, namely plate 77, acts as both a central support—for the connection of handle 72, arms 102, 103 (through the intermediate support element including flanges 90, 91, base 98 and lightened sections 104, 105) and nose-piece 84—and a limiting device for the opening stroke of arms 102, 103.

The limitation of the opening stroke is obtained, as said above, by two parts of plate or ring 77 which protrude towards the interior; these two parts end with edge surfaces having limited areas in order to reduce or eliminate possible drawbacks deriving from the deposit of foreign matter on arms 132, 133 and plate 77 and to guarantee the limitation of the opening stroke at a constant value.

What is claimed is:

1. A gauge for checking linear sizes of mechanical parts, comprising: a support; an integral member including a first section coupled to the support, two resiliently flexible sections connected to the first section and defining relevant fulcrum devices; two further sections, each defining a relevant movable arm, connected to the flexible sections for rotation movement about the relevant fulcrum devices; two feelers coupled to the movable arms, respectively, for contacting the part to be checked; and transducer means coupled to the movable arms for providing a signal responsive to the mutual position of the movable arms, the transducer means including two transducer parts coupled to the movable arms, respectively, each transducer part and each feeler being coupled to the relevant movable arm on the same side with respect to the relevant fulcrum device, wherein the gauge further includes a protective nose-piece substantially housing the movable arms, said support being substantially a plate defining first and second sides and at least a through hole, the moving arms passing through the plate.

2. The gauge according to claim 1, wherein said member has, in proximity of the support plate, two lightened sections defining said resiliently flexible sections, the lightened sections being arranged on said first side of said plate, the transducer parts and the feelers being arranged on said second side of said plate.

3. The gauge according to claim 2, wherein said member is constituted by a bent spring-steel plate.

4. The gauge according to claim 2 or claim 3, wherein said first section includes a portion with a substantially rectangular periphery and two wings adjacent to this portion for coupling the member to the support plate; each arm including an intermediate portion defining a geometrical longitudinal axis, two stiffening side portions for defining with the intermediate portion a substantially channel cross-section, and a further wing substantially parallel to said intermediate portion for supporting the relevant feeler carried by the arm.

5. The gauge according to one of claims 1, 2 or 3, wherein said arms define, in proximity of the feelers, holes for housing said transducer parts, the transducer means consisting of a differential transformer transducer and said transducer parts including, respectively, a shell with electric windings and a stem carrying a core.

6. The gauge according to claim 5, wherein said shell has a sealed base, the gauge including a resilient gasket coupled to the shell and the stem, for sealing the transducer.

7. The gauge according to one of claims 1, 2 or 3, for checking diameters of bores, wherein the nose-piece is fixed to the support plate, and the support plate defines a central hole for the passage of the movable arms, the support plate defining two limited internal reference surfaces adapted to cooperate with the movable arms for limiting their opening stroke.

8. The gauge according to claim 7, further including a handle, wherein said support plate on said second side thereof cooperates with an end of the nose-piece and on the first side thereof cooperates with the handle and with said member.

9. The gauge according to claim 8, wherein said support plate substantially consists of a ring plate defining said central hole, the ring plate having holes for fixing the handle, the nose-piece and the member, the ring plate defining two diametrally opposite parts protruding towards the interior, these parts defining said reference surfaces.

10. The gauge according to claim 9, wherein said protruding parts have substantially the shape of two triangular prisms, one edge of each prism defining the relevant reference surface.

11. The gauge according to claim 4, wherein said two wings contact said first side of the support plate in two areas oppositely arranged along a diametral direction of the support plate, and said support plate further defining protruding parts which define opposite reference surfaces along a direction perpendicular to that defined by said areas.

12. The gauge according to claim 7, wherein said protection nose-piece has an outer surface for centering the gauge with respect to the bore to be checked, said transducer means being arranged substantially within the nose-piece.

* * * * *